United States Patent
Jacobs et al.

(10) Patent No.: US 11,785,956 B2
(45) Date of Patent: Oct. 17, 2023

(54) METHOD AND DEVICE FOR POSITIONING AND/OR HANDLING CARCASSES AND/OR CARCASS PARTS DURING THE SLAUGHTER OF ANIMALS ON AN INDUSTRIAL SCALE

(71) Applicant: HUMBOLDT B.V., Lichtenvoorde (NL)

(72) Inventors: Thomas Gerardus Maria Jacobs, Lichtenvoorde (NL); Heinz Madsen, Lichtenvoorde (NL)

(73) Assignee: HUMBOLDT B.V., Lichtenvoorde (NL)

( * ) Notice: Subject to any disclaimer, the term of this patent is extended or adjusted under 35 U.S.C. 154(b) by 160 days.

(21) Appl. No.: 17/296,148

(22) PCT Filed: Nov. 21, 2019

(86) PCT No.: PCT/NL2019/050769
§ 371 (c)(1),
(2) Date: May 21, 2021

(87) PCT Pub. No.: WO2020/106151
PCT Pub. Date: May 28, 2020

(65) Prior Publication Data
US 2022/0022470 A1    Jan. 27, 2022

(30) Foreign Application Priority Data
Nov. 22, 2018    (NL) ...................................... 2022052

(51) Int. Cl.
*A22B 5/00*    (2006.01)
*A22B 7/00*    (2006.01)
(Continued)

(52) U.S. Cl.
CPC ............ *A22B 5/0041* (2013.01); *A22B 7/002* (2013.01); *A22C 17/0093* (2013.01); *A22C 17/02* (2013.01)

(58) Field of Classification Search
CPC ....... A22B 5/0041; A22B 7/001; A22B 7/002; A22C 17/0093; A22C 17/02
(Continued)

(56) References Cited

U.S. PATENT DOCUMENTS

| 5,626,515 A | 5/1997 | Krogh |
| 6,860,804 B2 | 3/2005 | Kruger |

(Continued)

FOREIGN PATENT DOCUMENTS

| CN | 1121685 A | 5/1996 |
| CN | 102858181 A | 1/2013 |

(Continued)

OTHER PUBLICATIONS

International Search Report and Written Opinion from PCT Application No. PCT/NL2019/050769, dated Mar. 30, 2020.
(Continued)

*Primary Examiner* — Richard T Price, Jr.
(74) *Attorney, Agent, or Firm* — WORKMAN NYDEGGER (57) ABSTRACT

The present invention relates to a device for automatically positioning and/or handling a carcass and/or carcass part during the slaughter of animals on an industrial scale and to a device for cutting a carcass and/or carcass part during the slaughter of animals on an industrial scale. The invention also relates to a method for automatically positioning and/or handling a carcass and/or carcass part of a slaughtered animal during the slaughter of animals on an industrial scale as well as a method for automatically cutting a carcass (Continued)

and/or carcass part of a slaughtered animal during the slaughter of animals on an industrial scale.

25 Claims, 5 Drawing Sheets

(51) Int. Cl.
*A22C 17/00* (2006.01)
*A22C 17/02* (2006.01)

(58) Field of Classification Search
USPC .......................................................... 452/157
See application file for complete search history.

(56) References Cited

U.S. PATENT DOCUMENTS

| | | |
|---|---|---|
| 8,986,081 B2 | 3/2015 | Ueffing et al. |
| 9,004,988 B2 | 4/2015 | Van Der Steen et al. |
| 9,091,673 B2 | 7/2015 | Fern et al. |
| 9,192,172 B2 | 11/2015 | Van Der Steen et al. |
| 9,717,257 B2 | 8/2017 | Van Der Steen et al. |
| 9,778,651 B2 | 10/2017 | Strong et al. |
| 2004/0058636 A1 | 3/2004 | Hinsch et al. |
| 2004/0231480 A1 | 11/2004 | Wattles et al. |
| 2006/0182603 A1 | 8/2006 | Hawes |
| 2006/0199486 A1 | 9/2006 | Briel |
| 2012/0040597 A1 | 2/2012 | Fern et al. |
| 2012/0315834 A1 | 12/2012 | Van Der Steen et al. |
| 2013/0029574 A1 | 1/2013 | Van Der Steen et al. |
| 2013/0303065 A1 | 11/2013 | Ueffing et al. |
| 2015/0205288 A1 | 7/2015 | Strong et al. |
| 2015/0320058 A1 | 11/2015 | Fern et al. |
| 2016/0037787 A1 | 2/2016 | Van Der Steen et al. |
| 2017/0151673 A1 | 6/2017 | Kobayashi et al. |
| 2020/0254641 A1* | 8/2020 | Hocker ............... A22C 17/0093 |
| 2020/0288729 A1* | 9/2020 | Blaine ................... G05B 17/02 |

FOREIGN PATENT DOCUMENTS

| | | |
|---|---|---|
| CN | 103081973 A | 5/2013 |
| CN | 103931728 A | 7/2014 |
| CN | 105798941 A | 7/2016 |
| CN | 108142533 A | 6/2018 |
| FR | 2875105 A1 | 3/2006 |
| JP | S5921337 A | 2/1984 |
| JP | H05108165 A | 4/1993 |
| JP | 2004509649 A | 4/2004 |
| JP | 2006524045 A | 10/2006 |
| JP | 2013099329 A | 5/2013 |
| JP | 2017100214 A | 6/2017 |
| WO | 0167873 A1 | 9/2001 |
| WO | 0230208 A1 | 4/2002 |
| WO | 2005051812 A1 | 6/2005 |
| WO | 2007042234 A1 | 4/2007 |
| WO | 2015168511 A2 | 11/2015 |

OTHER PUBLICATIONS

Netherlands Search Report from corresponding Application No. NL2022052, dated Aug. 8, 2019.
"Smarter Gripper Knows When to Pick Up," Machine Design, vol. 63, No. 18, Sep. 12, 1991, p. 50.
Office Action from corresponding Chinese Application No. 201980077293.4, dated Dec. 30, 2022.
Search Report from corresponding Chinese Application No. 201980077293.4, dated Dec. 22, 2022.
Search Report from corresponding Chinese Application No. 201980077293.4, dated Feb. 27, 2022.
Office Action from corresponding Chinese Application No. 201980077293.4, dated Mar. 3, 2022.
Japanese Office Action from Corresponding Japanese Patent Application No. JP2021-528387, dated Aug. 1, 2023.

* cited by examiner

METHOD AND DEVICE FOR POSITIONING AND/OR HANDLING CARCASSES AND/OR CARCASS PARTS DURING THE SLAUGHTER OF ANIMALS ON AN INDUSTRIAL SCALE

BACKGROUND

The invention relates to a device for automatically positioning and/or handling a carcass and/or carcass part during the slaughter of animals on an industrial scale and to a device for cutting a carcass and/or carcass part during the slaughter of animals on an industrial scale. The invention also relates to a transporting system for transporting carcasses and/or carcass parts during the slaughter of animals on an industrial scale. Furthermore the invention includes a method for automatically positioning and/or handling a carcass and/or carcass part of a slaughtered animal during the slaughter of animals on an industrial scale as well as a method for automatically cutting a carcass and/or carcass part of a slaughtered animal during the slaughter of animals on an industrial scale.

During the slaughter of animals on an industrial scale, such as pigs and cows in particular, normally the carcasses of killed animals are suspended hanging from moveable hooks on their hind legs from a transfer (conveyor) system in order to be carried along a number of processing stations. Examples of such processes are: cleaving of the pubic bone, opening of the belly, detaching of the outer end of the rectum (also referred to as vent cutting), severing of the pizzle, removal of guts and/or various other processing steps. After the carcass parts (normally fully or partially separated halves) are thus prepared normally they are released from the transport system for further processing, more in particular to be further subdivided in a butchering process for instance initially with a "primal cut" in a shoulder part, a middle part and a ham. Carcass parts subdivided from a whole or half carcass may manually be handled and moved to another transport system or operating station. As an alternative the subdivided parts may drop down uncontrolled to another transport system or operation station or may further be transported in the position wherein they are separated. Different countries may subdivide the carcass in different ways, and the cuts may also differ between various types of carcasses. During all the carcass processing steps it is of great importance that operations on the carcass are performed with high accuracy and that the operations have the least possible adverse effect on the quality of the meat.

The U.S. Pat. No. 6,860,804 describes a method and system for the improved primal cutting of meat items like for instance half carcasses of animals. As disclosed in this patent traditionally the half carcasses where placed on a conveyor belt to enable an operator to manually correct the position of the carcasses such that the carcass parts are placed in a correct position to pass a saw (circular knife) which is disposed above the conveyor belt. The improvement as proposed in the patent is to make use of a lying-down module for placing the meat items to be cut up on a set of conveyors.

The present techniques for positioning and manipulating carcasses and carcass parts during the slaughtering process, such as during the subdividing of the carcasses of slaughtered animals, are flexible when made manually but inflexible and with limited control when mechanised. Furthermore mechanisation requires serious investments and/or leads to difficulties in fulfilling the varying—but high—hygiene demands of meat handling processes, more precise to prevent cross contamination of carcass parts. A problem in the prior art is thus to realise accurate, stabile and hygienic positioning of carcasses and carcass parts during the slaughter of animals on an industrial scale.

SUMMARY

The present invention has for its object to provide an improved method and device for positioning and/or manipulating stunned animal carcasses and/or carcass parts of slaughtered animals that enable an enhanced efficient and effective processing of the carcasses and carcass parts that may also result in an enhanced hygiene of the processing.

A first aspect of the invention relates to a device for automatically positioning and/or handling and/or transporting a stunned animal or a carcass and/or a carcass part of a slaughtered animal during the slaughter process of animals on an industrial scale, comprising:

a controlled first robotic manipulator with at least four axis;

at least one suction element and/or mechanical meat gripper for contacting a surface of the stunned animal or carcass and/or carcass part;

an extractor connected to the at least one suction element for performing a suction effect in the suction element and/or an actuator connected to the meat gripper for making the meat gripper gripping a part of the stunned animal, the carcass or the carcass part, and at least one controller for controlling the robotic manipulator, the extractor and/or the actuator.

In an embodiment the invention relates to a device for manipulating and/or handling a carcass and/or carcass part of a slaughtered animal during the slaughter of animals on an industrial scale, comprising: a controlled robotic manipulator; at least one suction element for contacting a surface of the carcass and/or carcass part; a suction element carrying frame holding the at least one suction element, which suction element carrying frame is attached to the robotic manipulator; and an extractor connected to the at least one suction element.

The device may positioning, handle and/or transport stunned animals or carcasses and/or carcass parts of animals. Positioning, handling and/or transporting may be performed throughout the slaughtering process of a corresponding state of an animal or of a part of a slaughtered animal.

As an example the slaughtering process where the carcasses and/or carcass parts of animals are handled in the context of the present invention the part of the slaughtering process is understood after the initial phase wherein the animals are killed up until the deboning phase. This includes thus the first stages of cutting the carcass into larger carcass parts (also referred to as the primal cutting). Another definition for the slaughtering process in the context of the present invention are the phases during slaughtering indicated as the "dirty line" (during which phase—among others—the intestines are removed), the "clean line" (during which phase the carcass without intestines is further processed), the cooling phase and the initial cutting phase (wherein normally the carcasses or carcass halves are divided in primary carcass parts).

The subsequent phase in the processing of the carcasses, and which may or may not be included in the context of the present invention is the deboning phase wherein bones are removed from the carcass parts. Preferably the device can be used for multiple processing steps performed when handling and processing stunned animals or carcasses at slaughter houses.

Preferably the invention relates to positioning and/or handling and/or transporting carcasses or carcass parts. Though, the invention, except when performing any cutting, may also be used for stunned animals. The person skilled in the art knows when the device may be used for stunned animals, and such processes may be comprised when describing the invention relating to carcasses, except for cutting processes.

Use of at least one suction element for contacting and holding a carcass and/or carcass part enables the part of the suction element being in contact with the surface to simply adapt to the specific shape and dimensions of each individual meat item to be hold. Use of at least one mechanical meat gripper may be performed by gripping part of the surface. Meat grippers may be used as an alternative to suction elements or together with suction elements to increase the hold of the carcass or carcass part.

Furthermore the use of a robotic manipulator enables to use "of the shelf" technology for the control of the at least one suction element or a mechanical meat gripper and provides a high freedom of movement.

There a various types of robotic manipulators know in the art, for instance robotic manipulators embodied as "robot arms". The first controlled robotic manipulator may be a robotic manipulator with at least four axis, such as a 4-axis robotic manipulator, and may be a 5-axis robotic manipulator, such as a 6-axis robotic manipulator, e.g. a 7-axis robotic manipulator. The number of axis corresponds to the number of freedom in the robotic manipulator.

As for the control of the robotic manipulator preferably a control system, such as a processor and/or controller, may be included in the positioning and/or handling device according to the present invention. A processor or controller for processing information obtained by at least one detector may be capable of communicating with at least one of: a first robotic manipulator, an extractor, an actuator, a controller and at least one detector.

The at least one detector may be for monitoring the position of a stunned animal, a carcass or a carcass part of a slaughtered animal for obtaining information related to at least a part of the stunned animal, the carcass or the carcass part. Such information obtained by the at least one detector may be related to position of the carcass or carcass part, where a position may be the position of a pre-determined area of the carcass or carcass part, e.g. a pre-determined area of the ham part, shoulder part or middle part of a carcass or carcass part. By obtaining information relating to the position of the carcass or carcass part, the device may process such information and automatically position e.g. at least one suction element or at least one meat gripper for contacting a surface part of the carcass or carcass part. Suction element (s) and/or meat gripper(s) may be contacted to any predetermined area of the carcass or carcass part which is to be positioned, handled and/or transported.

The suction element at least partly seals against the carcass and/or carcass part to enable creating an underpressure (pressure below atmospheric pressure) in the suction element. Dependent on the size and situation wherein the positioning device is to be used the positioning device may also comprise two or more than two suction elements. In this respect "two suction elements" may be understood as two separate suction elements but also an embodiment wherein in a single housing two or more compartments are provided is included in the understanding of "two suction elements". The at least two suction elements enable the handling of for instance complex shaped and/or heavy carcasses and/or carcass parts that are difficult to handle with a single and non-comparted suction element. To prevent loss of control due to leakage of a single compartmented suction element during the handling of the carcass/carcass part the suction element may be provided with multiple suction compartments and/or multiple suction elements. With multiple suction compartments and/or multiple suction elements a single leakage in the contact with the carcass and/or carcass part the complete grip on the carcass/carcass part will get lost. The effect of plural compartments and/or plural suction elements is that when a local leak of the coupling of the suction element and the carcass/carcass part occurs (for instance due an irregularity in the meat surface; damage of the suction element, an external force etc.) a single compartment and/or a single suction element may lose its grip, but the one or more compartments and/or suction elements will maintain their grip onto the meat item.

The device may also comprise more than one mechanical meat gripper, e.g. at least two mechanical meat grippers, or at least one suction element and at least one mechanical meat gripper. Suction elements and mechanical meat gripper may be used for contacting surfaces with different surface characteristics. For instance suction elements may not be suitable for surfaces with cavities or bone parts, and mechanical meat grippers can be used for such surfaces.

Manipulating and/or handling as referred to in relation to the present invention has to be interpreted broadly; so all operations onto a carcass or carcass part including for example positioning, guiding, holding, pushing, tearing off, moving, and so on are including in the wording "manipulating and/or handling". Furthermore the robotic manipulator may be any automatic manipulator but a specific advantageous robotic manipulator that provides freedom in operation includes at least six degrees of freedom (a so called 6-axis robotic manipulator).

The "extractor" or suction device may be any type of source that is able to provide a lower pressure than atmospheric pressure, like for instance a (vacuum-)pump or a suction pipe system.

The present invention may also be provided with an intelligent control unit, which may physically be integrated with the robotic manipulator or may be located on distance of the robotic manipulator, e.g. on a location that is more favourable for manual interaction—for instance by an operator—with the intelligent control unit and/or a location that has hygienic and/or operational advantages.

The at least one suction element may be provided with at least one flexible cup or at least a flexible rim of the suction element. Such flexible cup or flexible rim enables the suction element to adapt simply and by itself onto the shape of the surface of the carcass or carcass part to be gripped and to connect seamlessly (and thus medium-tight) onto the surface of the carcass or carcass part. A flexible cup is also simple to produce, not expensive, easy to exchange or adapt (for instance to anticipate on wear or different product sizes and/or shapes of meat items to be handled) and simple to clean.

To optimise the contact of the suction element with the carcass/carcass part the circumference of the suction element (e.g. the flexible cup) may be provided with a multi-layered rim or multi-layered outer border. Such embodiment of a suction element may also be provided with concentric controlled suction element compartments. Again such features could limit the consequences of undesired leakage of the suction element during operation.

In case of more than one suction element is applied, the suction element carrying frame may be provided with plural mutual moveable suction element holding arms. Such suction element carrying arms may also be provided with one or more fixations for locking the relative mutual positions of the suction element holding arms. The moveable suction element holding arms enable to adapt the mutual position of the suction elements to the specific geometry and size of individual carcasses and/or carcass parts (together also referred to here as "meat items") so to make it possible for each individual meat item to be positioned independent of any geometrical and size deviations of such meat item the average geometry. Furthermore the use of a robotic manipulator also enables to adapt the prepositioning of the suction elements to the specific geometry of each meat item even further enhancing the flexibility in orientation of the positioning device. After bringing the suction elements in solid contact with the meat item the relative mutual orientation of the suction elements may be locked (fixed). The result is now that the positioning of the carcass and/or carcass part is controlled (secured). The means to realise such securing of the orientation of a meat item are relatively simple to control and to automatize. To provide a good contact of the suction elements with the meat items the suction element holding arms may mutually resiliently attached to the suction element carrying frame. This makes it possible to position the suction elements by simply pushing the suction elements against the meat item; the position of the suction elements may just follow by the resilient movement of the moveable suction element holding arms. The positioning device according to the present invention enables a stable, hygienic and economical automatic positioning of meat items in a slaughtering line that also requires limited space. The simple positioning enables easy further processing of the meat items.

A further feature to limit the chance of undesired leakage of the suction element is to provide an outer border of the suction element with biasing means which biasing means make the outer border of the suction element to exert a certain pressure onto the carcass/carcass part to be handled. Such pressure on the outer border of the suction element may also be provided by gas (air) blowing onto the outside of the outer border of the suction element, especially during the initial contact of the suction element with the carcass/carcass part. As soon as the suction element is well in contact with the carcass/carcass part an under pressure is established in the suction element, hereby the contact of the suction element and the carcass/carcass part will easier be maintained. The more critical phase of establishing the under pressure is during the initial contact phase of the suction element and the carcass/carcass part.

The suction element may further comprise spikes to secure a good grip of the carcass or carcass part. The spikes may project from a basis part of the suction element and should be of a length not interacting with the rim part when the suction element is in function, hereby securing the rim of the suction element can obtain a safe hold on the surface of the skin or meat. The spikes may be made of a flexible material or may be non-flexible. Tips of the spikes may be pointed, capable of engaging with the skin surface or meat surface. Non-flexible spikes e.g. with pointed tip may increase the hold on the skin/meat as the spike tip may be pricked towards the skin surface or meat surface securing the carcass or carcass part cannot slide off the hold.

The suction element may also comprise grooves in the basis part of the suction element. When in function the skin or meat surface may be sucked into these grooves securing non-sliding of the carcass or carcass part as described for the spikes. Grooves in the basis part of the suction element may be parallel to the length of the suction element. When a suction element is in function, the grooves should preferably be perpendicular to a gravity force provided onto the carcass or carcass part to handle, hereby when lifting a carcass or carcass part, the grooves are preferably horizontal located in the suction element. Grooves may be of any dimensions, preferably grooves are at least 4 mm width and at least 2 mm deep.

The suction element is preferably slightly curved to follow the surface of the carcass or carcass part to handle. Preferably the curve of the suction element resemble the curve of a pig shoulder, especially if the suction element is to be used to hold onto an carcass shoulder or handle a carcass or carcass part including the shoulder part.

The positioning device may also include at least one detector for monitoring the position of the carcass or carcass part of a slaughtered animal. The meat items to be handled with the positioning device according to the present invention have not to be forced in only a single (standardised) position as occurs in mechanised positioning according to the prior art. The present invention enables positioning and/or manipulating each carcass or carcass part dependent on the individual size and shape characteristics of each individual meat item. This enables an individual further processing of the positioned meat items if and when their individual shape, size and/or position is detected/recorded. The detector for monitoring the individual shape, size and/or orientation of the meat items may be for instance a vision system with one or more camera's and/or other detectors. One or more of such detectors may be attached to the first robotic manipulator but may also be located on a distance of the first robotic manipulator (for instance more or less upstream of the slaughtering process) as long as they co-operate with the automatic controlled robotic manipulator. Such detector may not only be helpful during establishing the initial contact between the suction element and/or the meat gripper and the carcass/carcass part but may also be used for accurate further handing of the carcass/carcass part after the carcass/carcass part is held by the suction element and/or meat gripper.

To enhance the hygiene of the positioning of the meat items, a cleaning tool may be provided for cleaning the suction element and/or meat gripper. Especially the element or elements that have contact with the meat, thus a suctions element, may be responsible for cross contaminating the meat. Ideally a suction element or meat gripper is cleaned after each contact with a meat item and before contacting a subsequent meat item. Such cleaning is preferably performed in the "dirty line", whereas in the "clean line", the risk of contamination is lower, though still present.

The positioning device may also comprise a mechanical meat gripper as an additional control element or as the only element for holding and positioning a carcass and/or carcass part. Such meat gripper may be an active steered (clamping) griper but the meat gripper may also be a simple support structure (like one or more support pins or a support surface). The provision of an additional mechanical (additional to and as alternative for a suction gripper) may provide an additional safeguard for when the suction element loses its grip and/or for absorbing forces when intensive operations are executed on the carcass and/or carcass part held by the positioning device.

In another aspect, the present invention also provides an assembly of a positioning device according to the present invention in combination with a transporting system for carrying the carcasses and/or carcass parts.

In an embodiment the transporting system comprises an overhead conveyor system carrying carcasses and/or carcass parts suspended from the hind legs on moveable hooks.

As the handling of meat items in plants for slaughtering on an industrial scale already often takes place with overhead carrier systems, like for instance conveyor systems carrying moveable hooks, the positioning may take place without further transfer of the meat items. They may simply—in line—be positioned without further requiring any transfer, thus limiting the chance of contamination, without requiring any additional investments for the transfer and without using up any additional space.

A further embodiment of a transporting system including the positioning device according to the present invention includes a conveyor belt. A meat item may be moved, e.g. after loosening from a larger carcass part, onto a conveyor belt for further transportation, but the positioning device may also pick a carcass and/or carcass part up from a meat conveyor supply belt.

A further aspect of the present invention provides a cutting device for automatically cutting a carcass and/or carcass part of a slaughtered animal during the slaughter of animals on an industrial scale, comprising the positioning device according to the present invention in combination with a cutting blade.

"Positioning" may imply different meanings, though, at least in relation to a cutting device, "positioning" means the carcass or carcass part is held and supported such that the hold counteracts the pressing or dragging forces applied to the carcass or carcass part by at least one cutting blade getting in contact with the carcass or carcass part and performing a cut, or when a dragging device contacts and drag a meat part from the carcass or carcass part. Hereby the forces applied by the cutting blade or dragging device do not change the position of the carcass or carcass part.

The cutting device may also comprise a transporting system according to the present invention.

Also at least one conveyor belt may be part of the invention. Such a conveyor belt may be for transporting meat parts cut off by the cutting device described herein. A cutting system may comprise:
- an overhead transport/handling system to transport carcasses or carcass part, such as carcass parts hanging in a hind leg, and
- an overhead mounted first manipulator configured to positioning and/or handling carcass parts, and/or
- an overhead mounted cutting device such as a second manipulator configured to cutting a carcass part, and
- at least one conveyor belt located below, i.e. closer to the floor, relative to the transport system, the first manipulator and/or the second manipulator.

In general, a cutting device may be a stationary device, which is not to be moved when performing a cut.

The cutting blade may for instance be a rotatable cutting knife, an intermittently moving cutting knife or a stationary cutting knife. The knife may also be carried by a second controlled drive, for instance a second robotic manipulator, which may be a 1-axis robotic manipulator, such as a 2-axis robotic manipulator, e.g. a 3-axis robotic manipulator, such as a 4-axis robotic manipulator, e.g. a 5-axis robotic manipulator, such as a 6-axis robotic manipulator, e.g. a 7-axis robotic manipulator. The number of axis corresponds to the number of freedom in the robotic manipulator.

The cutting device described herein may also be a system where the carcass or carcass part is cut 'on the fly'. The system may be configured such that the carcass or carcass part overall is transported in a first direction, though positioned by the at least one suction element and/or mechanical meat gripper, and the cutting blade carried by a controlled cutting blade drive is transported in a second direction, which is similar or different from the first direction. The first and second transport direction may at a cutting location be opposite of each other.

The described combination of features enables to cut a carcass or carcass part for instance while it is still in a hanging position thus fed in line from the previous slaughtering steps to a cutting position to undergo for instance a primal cutting and to subsequently remove the cut off meat part to a further processing station or conveyor system. For instance instead of uncoupling the preceding slaughtering steps from the primal cut the cutting according to the present invention may be performed fully in line. This is not only faster and cheaper (as a complex time and space consuming transfer step between different transport systems is made superfluous) but it also enhance the control on hygiene. The cutting may thus be performed with the carcasses and/or carcass parts suspended from the hind legs on a standard transporting system used for the initial slaughtering processing steps like a conveyor system carrying moveable hooks. Furthermore the cut loose carcass parts may be removed with for instance a conveyor belt on which the loose carcass parts drop down, or the cut off carcass parts are positioned onto the conveyor belt by the first robotic manipulator. When a carcass part is positioned on the conveyor belt the suction element and/or meat gripper may be de-activated to release the carcass part from the first robotic manipulator.

Separation of carcass part using the device according to the present invention may not only be realised using the device in combination with a knife or saw. An alternative for separation is pulling certain carcass parts loose. An example is "loin pulling", when a loin may be held with the suction element so well that the loin may be pulled off. More often the tenderloin is loosened by pulling at least a part of this meat from the carcass.

Another aspect of the invention relates to a method for automatically positioning and/or handling and/or transporting a stunned animal or a carcass and/or a carcass part of a slaughtered animal during the slaughtering process of animals on an industrial scale, comprising the steps:
- a) providing a stunned animal or a carcass and/or a carcass part of a slaughtered animal;
- b) bringing at least one suction element and/or at least one mechanical meat gripper in contact with a surface of the stunned animal or carcass and/or carcass part, where the at least one suction element and/or at least one mechanical meta gripper is controlled by at least one robotic manipulator with at least four axis; and
- c1) activating an extractor for locking the at least one suction element to the surface of the stunned animal or of the carcass and/or carcass part by creating an under pressure in the at least one suction element and/or
- c2) activating an actuator for locking the at least one mechanical meat gripper to the surface of the stunned animal or of the carcass and/or carcass part,
- d) hereby positioning and/or handling the stunned animal or the carcass and/or the carcass part.

In the method step d) may further comprise the step of pulling or pressing or lifting the stunned animal or the carcass and/or the carcass part.

The method for automatically positioning a carcass and/or carcass part of a slaughtered animal during the slaughter of animals on an industrial scale, may also comprise the steps:

providing a carcass and/or carcass part of a slaughtered animal suspended from the hind legs; bringing at least one suction element in contact with a surface of the carcass and/or carcass part; and locking the relative position of the suction element in contact with the surface of the carcass and/or carcass part by lowering the pressure in the suction element.

With this method the advantages as mentioned above in relation to the positioning device according to the present invention—that are here included by reference—may be realised. The method is simple to perform and requires only limited investment in the positioning tool but enables to subsequently process meat items even if they have varying sizes and/or when there is a difference between the meat items. In this respect also reference is made to slaughtering lines wherein subsequently left and right carcass parts are transported. In the prior art such different halves normally were processed on different lines or they had to be repositioned to enable processing. According to the present method and with the devices according to the present invention the subsequent processing of different sides of carcasses requires no problem and even does not require any adjustments. The further processing is supported by detecting the position, optionally including size and/or shape, of the carcass and/or carcass part to be contacted by at least one locked suction element and/or at least one meat gripper. The information resulting from automatic position detection of such position(s) may subsequently be used to the control of the movement of the at least one suction element or at least one meat gripper that is brought in contact with the surface of the carcass and/or carcass part. As the orientation, shape and size of each meat item are detected the subsequent processing of the meat items is easy to be individualized by an intelligent control system. As an additional safeguard and/or to enable the exertion of substantial forces the carcass and/or carcass part may in additionally to be held by a suction element also be held by a mechanical meat gripper.

The method as described above may during processing step b) comprise plural suction elements and/or plural mechanical meat grippers at various locations which are brought in contact with the surface of the stunned animal or the carcass and/or the carcass part; and that during processing step c) the suction elements and/or mechanical meat grippers are locked in their relative mutual positions of contact with the surface of the stunned animal, the carcass and/or the carcass part.

Before bringing the at least one suction element and/or the at least one mechanical meat gripper in contact with a surface of the stunned animal, the carcass and/or the carcass part according to processing step b) at least one position of the stunned animal or the carcass and/or carcass part contacted by the at least one suction element and/or meat gripper may be automatically detected and the resulting position information can be used to the control of the movement of the at least one suction element and/or meat gripper.

A further aspect of the invention relates to a method for automatically cutting a carcass and/or carcass part of a slaughtered animal during the slaughter of animals on an industrial scale, comprising the steps: positioning a carcass and/or carcass part according to the positioning method according to the present invention and cutting a positioned carcass and/or carcass part with a cutting knife. Such a cutting may be realised by using a rotating cutting blade.

An intelligent control system e.g. based on at least one detector and a processor may steer the cutting knife to compensate the movements from the cutting knife for the registered variations in positioning, shape and size of each of the meat items to be cut. As an alternative the knife may also be located on a stationary position and the carcass/carcass part may be moved along the stationary knife using the device according to the present invention for accurate displacement off the carcass/carcass part to be separated.

In the cutting method at least one suction element and/or mechanical meat gripper may be in contact with a surface area of a part of the carcass and/or carcass part which is to be cut off. This may secure more stability of the part to be cut off, and also the robotic manipulator may afterwards position the cut off meat part in a predetermined position such as on a conveyor belt, which may transport the meat part to another processing station. Furthermore, as soon as the carcass part is cut off, the other part of the carcass may be transported to another processing station.

Examples of cuttings according to the method described herein may be of pig half carcasses preferably hanging in the hind leg, though far more cuttings may be possible:

a. to cut off the shoulder part of a half carcass;
    b. cutting off the middle part from the ham part;
    c. splitting the middle part into a belly part and a loin part.

In example 'c', splitting the middle part into the belly part and the loin part may be performed before or after these parts are cut off the ham part. Example 'a' and 'b' may be performed in two steps or may be performed simultaneously in a system comprising two cutting blades each carried by a controlled cutting blade drive.

By positioning the carcass or carcass part as described herein the carcass or carcass part may be held such that no moving of the carcass or carcass part is performed, and it is thereby possible to increase the quality of the cut and hereby obtain a cut as preferred to obtain meat parts of high quality.

As indicated the cutting device may comprise at least one cutting blade, such as two cutting blades, e.g. three cutting blades. Preferably each cutting blade is individually controllable and carried by a controlled cutting blade drive. In a similar manner the cutting device may comprise at least one suction element and/or at least one mechanical meat gripper, such as, in total, two suction elements and/or mechanical meat grippers. Preferably, the number of suction elements and/or mechanical meat grippers are similar to or higher than the number of cuts to be performed simultaneously or straight after each other. If simultaneously performing the cuts described in example 'a' and 'b' indicated above, at least one suction element and/or at least one mechanical meat gripper may be engaged with each of the shoulder part and middle part to position the carcass part during the cuttings, and optionally to lift the cut off carcass parts to a predetermined position such as on a conveyor belt. Simultaneously, in example 'c' if splitting the middle part into a belly part and a loin part before cutting these parts from the ham part, to each of the belly part and loin part at least one suction element and/or at least one mechanical meat gripper may be positioning and optionally handling the cut off carcass parts.

An important further advantage of the present invention is that the process can be mechanized or automated and the method may thus be performed without the requirement of manpower. This results in a reduction of the manpower needed in a slaughter line, which may not only ensure an efficient process but may also have a positive effect on hygiene due to less human handling. Improved quality of the performed cuts and of the cut off meat parts are also important advantages.

BRIEF DESCRIPTION OF THE DRAWINGS

The present invention will be further elucidated with reference to the non-limitative embodiments in the following figures. Herein.

DETAILED DESCRIPTION OF VARIOUS EMBODIMENTS

Figure 1:
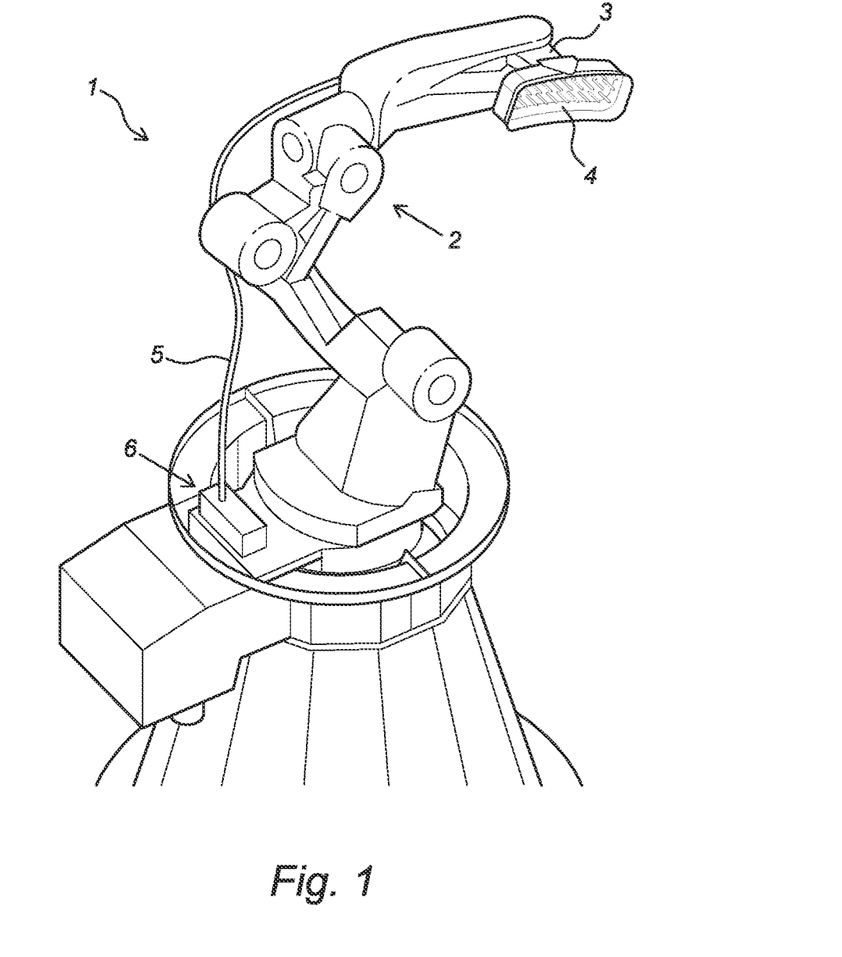
FIG. 1 shows a perspective view on a positioning device according the present invention.

FIG. 1 shows a positioning device 1 for positioning a carcass of a slaughtered animal (not show here) comprising a robotic manipulator 2 in the form of a robot arm; having at least four, such as six degrees of freedom. The robotic manipulator 2 holds a carrying frame 3 that holds a suction element 4. A duct 5 is on one side coupled to the suction element 4 which duct 5 on the opposite side connect to an extractor (extraction system) 6 that is here represented schematically.

Figure 2:
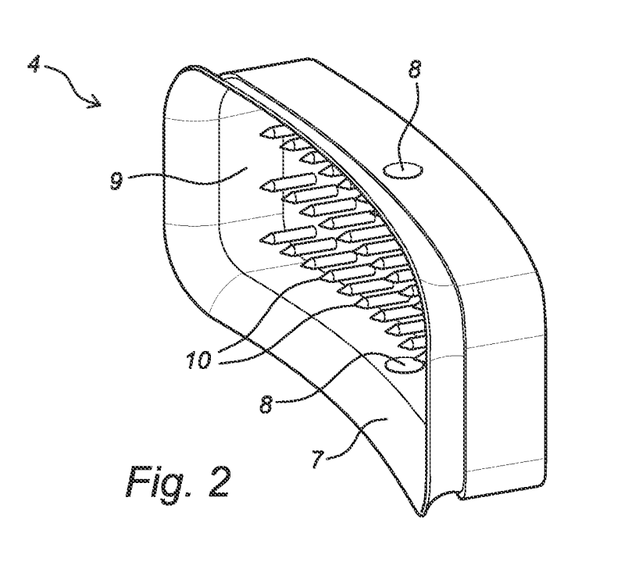
FIG. 2 a detailed perspective view on a suction element for contacting a surface of the carcass and/or carcass part as part of positioning device according the present invention.

FIG. 2 shows the suction element 4 in more detail. A rim 7 of the suction element is embodied as a highly flexible outer border to adapt to the shape of a carcass part to be contacted such that the suction element 4 may be gas-tight connect onto the meat surface. Via apertures 8 in the suction element 4 gas may be sucked out of the suction element 4, to—when in contact with the meat surface—create an under pressure in the internal volume 9 of the suction element 4. In the suction element 4 are spikes 10 fixed to control the position of the suction element 4 towards the meat surface contacted.

Figure 3:
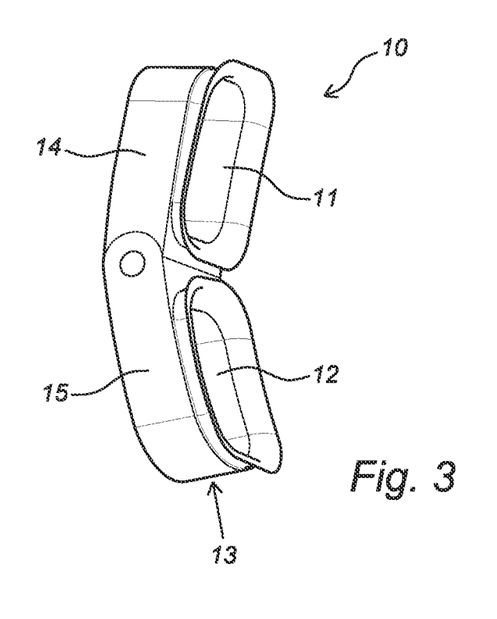
FIG. 3 a detailed perspective view on an alternative embodiment of a suction element as shown in FIG. 2, FIG. 4 a schematic view on a positioning device according the present invention including a cutting device operation on a hanging pig carcass.

FIG. 3 shows a perspective view on an alternative embodiment of a suction element 10 having two separate compartments 11, 12. The compartments 11, 12 of the suction element 10 are integrated in a frame 13, with two hinged moveable frame parts 14, 15.

Figure 4:
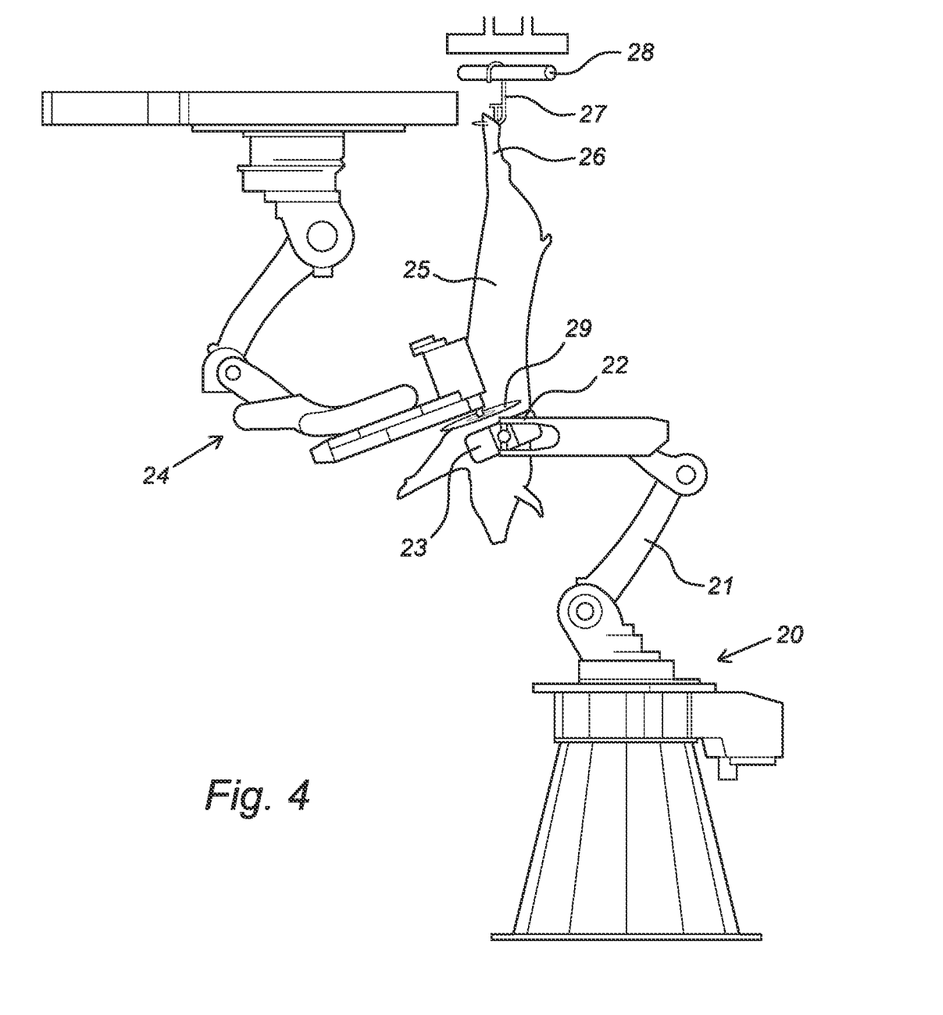

In FIG. 4 a positioning device 20, with robotic manipulator 21, carrying frame 22 and suction element 23 is cooperating with a meat cutter 24. The suction element 23 gripping the shoulder of a pig carcass 25 that is hanging with its hind leg 26 on a hook 27 of an overhead transport system 28. The positioning device 20 controls the position of the carcass 25 to enable the controlled meat cutter 24 to cut a part off the carcass 25 with rotating knives 29. After cutting off a carcass part (shoulder) this part is still gripped by the positioning device 20 enabling a controlled further removal of the loosened carcass part. The first robotic manipulator 21 is shown positioned on the floor, but may also be hanging as the second robotic manipulator, here illustrated by the meat cutter 24. A conveyor, such as a conveyor belt, may be located below and/or beside the system, and below a height above the floor, where the cutting is performed.

Figure 5:
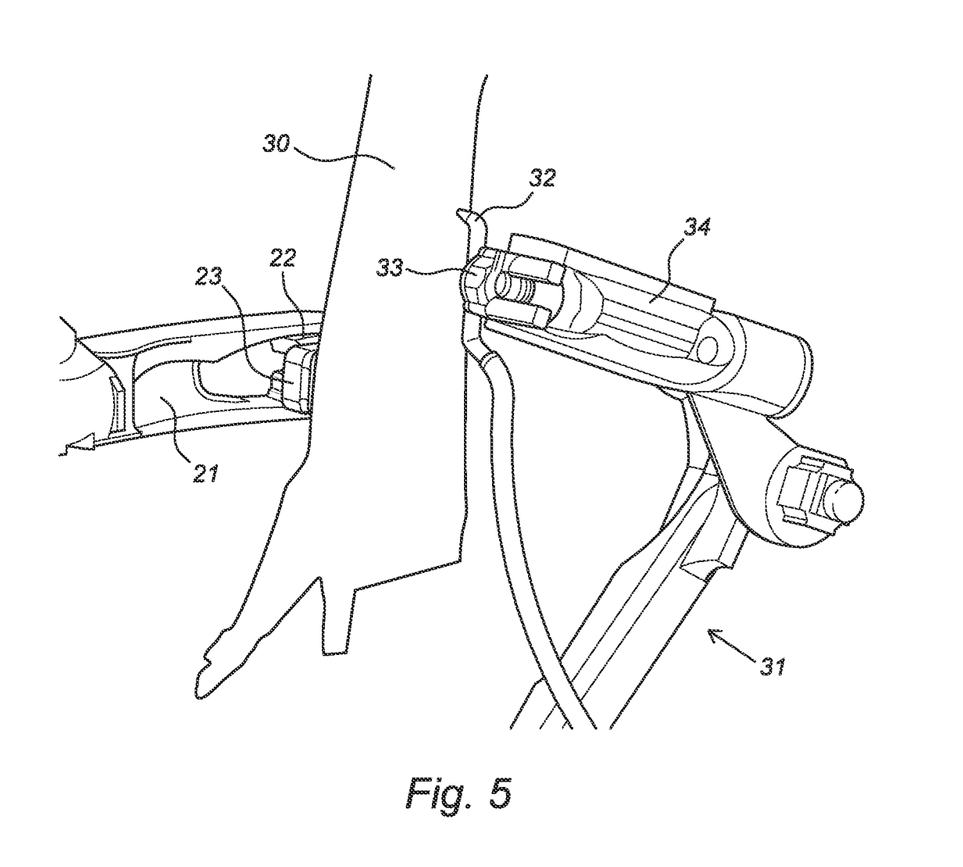
FIG. 5 a detailed perspective view on a suction element contacting a pig carcass in combination with a loin puller.

FIG. 5 shows an alternative operation on a hanging pig carcass 30 than shown in FIG. 4. Here again robotic manipulator 21, carrying frame 22 and suction element 23 are fixating the position of the hanging pig carcass 30 but now in cooperation with a spine extractor 31. Also the spine extractor 31 is a positioning device according the present invention as it comprises a suction element 32 held by a frame 33 that is moved by a robotic manipulator 34.

Figure 6:
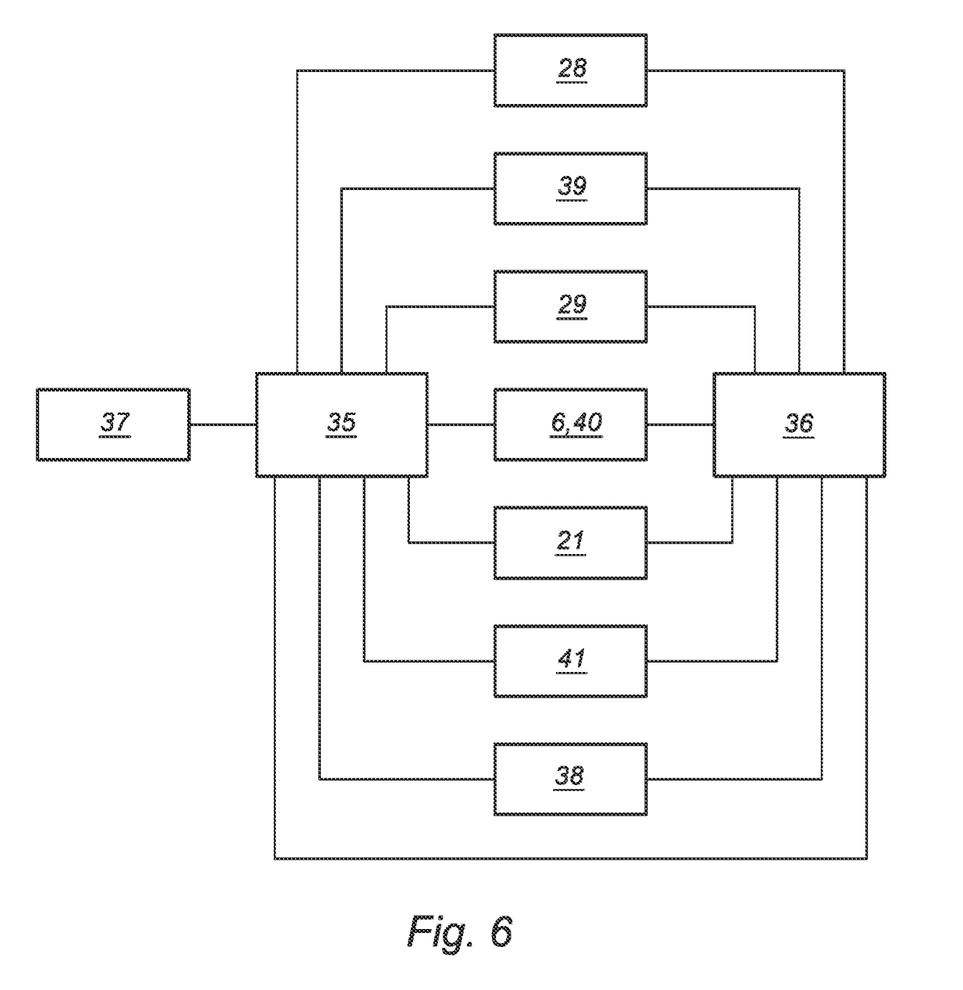
FIG. 6 illustrates communication between items in a possible setup of a system according to the invention.

FIG. 6 shows communication between items in a possible setup of a cutting system according to the invention. Most of the items are also illustrated in FIG. 4. Indicated is a controller 36 and CPU or processor 35 receiving data from or being in communication with

- at least one upstream computer/controller/detector/processor 37, suitable to communication information obtained upstream or information based on information obtained upstream, such as information related to a carcass or carcass part to be handled in the system,
- a transport system 28, such as an overhead transport system,
- a detector 38, such as a vision system,
- a cutting blade drive 39, such as a second robotic manipulator,
- a cutting blade 29, such as a knife or a saw,
- at least one extraction system 6 for a suction element 23 or at least one mechanical meat gripper 40,
- a first robotic manipulator for controlling at least one suction element 23 or at least one meat gripper 40
- optionally, a conveyor belt 41.

The controller 36 and CPU or processor 35 may be integrated in one item. In some systems the upstream computer/controller/detector/processor 37 and/or transport system 28 may not be present, and/or the cutting blade 29 and cutting blade drive 39 may be replaced with other tools for handling positioned carcasses or carcass parts.

EMBODIMENTS

Embodiment 1. Device for automatically positioning and/or handling a carcass and/or carcass part of a slaughtered animal during the slaughter of animals on an industrial scale, comprising:
  a controlled robotic manipulator;
  at least one suction element for contacting a surface of the carcass and/or carcass part;
  a suction element carrying frame holding the at least one suction element, which suction element carrying frame is attached to the robotic manipulator; and
  an extractor connected to the at least one suction element.

Embodiment 2. Positioning device according to embodiment 1, characterised in that the positioning device comprises at least two suction elements for contacting a surface of the carcass and/or carcass part.

Embodiment 3. Positioning device according to embodiment 1 or 2, characterised in that the at least one suction element comprises at least one flexible cup.

Embodiment 4. Positioning device according to any of the preceding embodiments, characterised in that the suction element carrying frame is provided with plural mutual moveable suction element holding arms.

Embodiment 5. Positioning device according to embodiment 4, characterised in that the suction element holding arms are mutually resiliently attached to the suction element carrying frame.

Embodiment 6. Positioning device according to any of the preceding embodiments, characterised in that the device also includes at least one detector for monitoring the position of a carcass or carcass part of a slaughtered animal.

Embodiment 7. Positioning device according to any of the preceding embodiments, characterised in that the device also comprises a cleaning tool for cleaning the suction elements.

Embodiment 8. Positioning device according to any of the preceding embodiments, characterised in that the device also comprises a mechanical meat gripper.

Embodiment 9. Transporting system for transporting carcasses and/or carcass parts during the slaughter of animals on an industrial scale, including a positioning device according to any of the preceding Embodiments.

Embodiment 10. Transporting system according to embodiment 9, characterised in that the transporting system comprises an overhead conveyor system carrying carcasses and/or carcass parts suspended from the hind legs on moveable hooks.

Embodiment 11. Transporting system according to embodiment 9 or 10, characterised in that the transporting system comprises a conveyor belt.

Embodiment 12. Cutting device for automatically cutting a carcass and/or carcass part of a slaughtered animal during the slaughter of animals on an industrial scale, comprising a positioning device according one of the embodiments 1-8 and at least one cutting blade carried by a controlled cutting blade drive.

Embodiment 13. Cutting device according to embodiment 12, characterised in that the controlled cutting blade drive is a second robotic manipulator.

Embodiment 14. Cutting assembly of a cutting device according to embodiment 12 or 13, the assembly further comprising a transporting system for carrying the carcasses and/or carcass parts.

Embodiment 15. Cutting assembly according to any of the embodiments 12-14, characterised in that the transporting system comprises an overhead conveyor system with moveable hooks for carrying carcasses and/or carcass parts suspended from the hind legs.

Embodiment 16. Method for automatically positioning and/or handling a carcass and/or carcass part of a slaughtered animal during the slaughter of animals on an industrial scale, comprising the steps:
  a) providing a carcass and/or carcass part of a slaughtered animal;
  b) bringing the at least one suction element in contact with a surface of the carcass and/or carcass part; and
  c) locking the at least one suction element to the surface of the carcass and/or carcass part by creating an under pressure in the at least one suction element.

Embodiment 17. Method according to embodiment 16, characterised in that during processing step b) plural suction elements at various locations are brought in contact with the surface of the carcass and/or carcass part; and that during processing step c) the suction elements are locked in their relative mutual positions of contact with the surface of the carcass and/or carcass part.

Embodiment 18. Method according to embodiment 16 or 17, characterised in that before bringing the at least one suction element in contact with a surface of the carcass and/or carcass part according processing step b) the at least one position of the carcass and/or carcass part contacted by the at least one suction element is automatically detected and the resulting position information is used to the control of the movement of the at least one suction element.

Embodiment 19. Method for automatically cutting a carcass and/or carcass part of a slaughtered animal during the slaughter of animals on an industrial scale, comprising the steps:
  positioning a carcass and/or carcass part according to any of the embodiments 14-16; and
  cutting a positioned carcass and/or carcass part with a cutting knife.

Embodiment 20. Cutting method according to embodiment 19, characterised in that the carcass and/or carcass part is cut with a with a rotating cutting blade.

The invention claimed is:

1. A device for automatically positioning and/or handling and/or transporting a stunned animal or a carcass and/or a carcass part of a slaughtered animal during a slaughter process of animals on an industrial scale, comprising:
  a controlled first robotic manipulator with at least four axis;
  at least one suction element and/or at least one mechanical meat gripper for contacting a surface of the stunned animal or carcass and/or carcass part;
  an extractor connected to the at least one suction element for performing a suction effect in the suction element and/or
  an actuator connected to the at least one meat gripper for making the meat gripper gripping a part of the stunned animal, the carcass or the carcass part, and
  at least one controller for controlling the robotic manipulator, the extractor and/or the actuator;
  wherein the at least one suction element or at least one mechanical meat gripper is configured for positioning the stunned animal of the carcass and/or carcass part of a slaughtered animal during further processing of the stunned animal or the carcass and/or carcass part of a slaughtered animal.

2. The device according to claim 1, further comprising at least one detector for monitoring the position of a stunned animal, a carcass or a carcass part of a slaughtered animal for obtaining information related to the position of at least a part of the stunned animal, the carcass or the carcass part.

3. The device according to claim 1, further comprising a processor for processing information obtained by the at least one detector, the processor being capable of communicating with at least one of:
  the first robotic manipulator,
  the extractor,
  the actuator,
  the controller and
  the at least one detector.

4. The device according to claim 1, wherein the first controlled robotic manipulator comprises at least a 5-axis robotic manipulator.

5. The device according to claim 1, comprising at least two suction elements and/or mechanical meat grippers, such as at least two suction elements, or at least two mechanical meat grippers, or at least one suction element and at least one mechanical meat gripper.

6. The device according to claim 1, wherein the at least one suction element comprises at least one flexible cup or at least a flexible rim to contact the surface of the stunned animal or carcass or carcass part.

7. The device according to claim 1, further comprising a suction element carrying frame holding the at least one suction element, which suction element carrying frame is attached to the first robotic manipulator.

8. The device according to claim 1, wherein the device also comprises a cleaning tool for cleaning the suction elements and/or the meat grippers.

9. A transporting system for transporting stunned animals, carcasses and/or carcass parts during the slaughtering process of animals on an industrial scale, where the transporting system comprises at least one positioning and/or handling device according to claim 1.

10. The transporting system according to claim 9, wherein the transporting system further comprises an overhead conveyor system for carrying stunned animals or carcasses and/or carcass parts suspended from the hind legs on moveable hooks connected to the overhead conveyor system.

11. The transporting system according to claim 9, wherein the transporting system further comprises a conveyor belt.

12. A cutting device for automatically cutting a carcass and/or carcass part of a slaughtered animal during the slaughtering process of animals on an industrial scale, the cutting device comprising:
 a positioning and/or handling and/or transporting device or a transporting system both according to claim 9, and
 at least one cutting blade.

13. The cutting device according to claim 12, wherein the at least one cutting blade are carried by a controlled cutting blade drive.

14. The cutting device according to claim 13, wherein the controlled cutting blade drive is a second robotic manipulator.

15. The cutting device according to claim 14, wherein the second controlled robotic manipulator comprises at least a 1-axis robotic manipulator.

16. A cutting assembly of a cutting device according to claim 12, the assembly further comprising a transporting system for carrying the carcasses and/or carcass parts.

17. The cutting assembly according to claim 16, wherein the transporting system comprises an overhead conveyor system with moveable hooks for carrying carcasses and/or carcass parts suspended from the hind legs.

18. A method for automatically positioning and/or handling and/or transporting a stunned animal or a carcass and/or a carcass part of a slaughtered animal during the slaughtering process of animals on an industrial scale, comprising the steps:
 a) providing a stunned animal or a carcass and/or a carcass part of a slaughtered animal;
 b) bringing at least one suction element and/or at least one mechanical meat gripper in contact with a surface of the stunned animal or carcass and/or carcass part, where the at least one suction element and/or at least one mechanical meat gripper is controlled by at least one robotic manipulator with at least four axis; and
 c1) activating an extractor for locking the at least one suction element to the surface of the stunned animal or of the carcass and/or carcass part by creating an under pressure in the at least one suction element and/or
 c2) activating an actuator for locking the at least one mechanical meat gripper to the surface of the stunned animal or of the carcass and/or carcass part,
 d) hereby positioning and/or handling the stunned animal or the carcass and/or the carcass part;
wherein the at least one suction element or at least one mechanical meat gripper is configured for positioning the stunned animal of the carcass and/or carcass part of a slaughtered animal during further processing of the stunned animal or the carcass and/or carcass part of a slaughtered animal.

19. The method according to claim 18, wherein step d) further comprising the step of pulling or pressing or lifting the stunned animal or the carcass and/or the carcass part.

20. The method according to claim 18, wherein during processing step b) plural suction elements and/or plural mechanical meat grippers at various locations are brought in contact with the surface of the stunned animal or the carcass and/or the carcass part; and that during processing step c) the suction elements and/or mechanical meat grippers are locked in their relative mutual positions of contact with the surface of the stunned animal, the carcass and/or the carcass part.

21. The method according to claim 18, wherein before bringing the at least one suction element and/or the at least one mechanical meat gripper in contact with a surface of the stunned animal, the carcass and/or the carcass part according to processing step b) at least one position of the stunned animal or the carcass and/or carcass part contacted by the at least one suction element and/or meat gripper is automatically detected and the resulting position information is used to the control the movement of the at least one suction element and/or meat gripper.

22. A method for automatically cutting a carcass and/or carcass part of a slaughtered animal during the slaughter of animals on an industrial scale, comprising the steps:
 positioning a carcass and/or carcass part according to claim 18; and
 cutting a positioned carcass and/or carcass part with a cutting knife.

23. The cutting method according to claim 22, wherein the carcass and/or carcass part is cut with a rotating cutting blade.

24. The cutting method according to claim 22, wherein at least one suction element and/or at least one mechanical meat gripper is in contact with a surface area of a part of the carcass and/or carcass part which is to be cut off.

25. The cutting method according to claim 24, wherein the at least one suction element and/or mechanical meat gripper is in contact with the surface area of a part of the carcass and/or carcass part which is to be cut off at least until the cut has been performed, and optionally until the cut off part is positioned in a predetermined location such as on a conveyor belt.

* * * * *